US011999031B2

(12) United States Patent
Palette et al.

(10) Patent No.: US 11,999,031 B2
(45) Date of Patent: Jun. 4, 2024

(54) FASTENING SOCKET FOR ASSEMBLING STRUCTURES AND ASSOCIATED ATTACHMENT

(71) Applicant: LISI AEROSPACE, Paris (FR)

(72) Inventors: Steven Palette, Mery ès Bois (FR); Julien Brachet, Mehun sur yèvre (FR); Vincent Defrance, Preuilly (FR)

(73) Assignee: LISI AEROSPACE, Paris (FR)

( * ) Notice: Subject to any disclaimer, the term of this patent is extended or adjusted under 35 U.S.C. 154(b) by 605 days.

(21) Appl. No.: 16/649,138

(22) PCT Filed: Sep. 21, 2018

(86) PCT No.: PCT/EP2018/075578
§ 371 (c)(1),
(2) Date: Mar. 20, 2020

(87) PCT Pub. No.: WO2019/057880
PCT Pub. Date: Mar. 28, 2019

(65) Prior Publication Data
US 2020/0290180 A1    Sep. 17, 2020

(30) Foreign Application Priority Data
Sep. 21, 2017    (FR) ...................................... 1758734

(51) Int. Cl.
*B25B 13/48*    (2006.01)
*B25B 23/00*    (2006.01)
(Continued)

(52) U.S. Cl.
CPC ........ *B25B 13/488* (2013.01); *B25B 23/0085* (2013.01); *B25B 31/005* (2013.01); *F16B 19/109* (2013.01)

(58) Field of Classification Search
CPC . B25B 13/488; B25B 23/0085; B25B 31/005; F16B 19/109
See application file for complete search history.

(56) References Cited

U.S. PATENT DOCUMENTS 3,096,678 A * 7/1963 Devine ............... F16B 37/0857
411/173
4,516,885 A * 5/1985 Calandra, Jr. ........... E21D 20/02
411/39
(Continued)

FOREIGN PATENT DOCUMENTS

DE    4400895    7/1995
DE    102015109278    12/2016
(Continued)

OTHER PUBLICATIONS

Hartnack, Kai, International Search Report (English Translation), Dec. 14, 2018, 3 pages, European Patent Office, Rijswijk, Netherlands.

*Primary Examiner* — Andrew M Tecco
*Assistant Examiner* — Nicholas E Igbokwe
(74) *Attorney, Agent, or Firm* — Henricks Slavin LLP

(57) ABSTRACT

The present invention concerns a fastening socket (112) for assembling at least two previously drilled structures, said socket comprising a substantially cylindrical body (34) and an enlarged head (35); said enlarged head comprising first mounting surfaces (42, 46) suitable for being assembled to a first installation component and for preventing said first installation component from rotating about the main axis. The socket comprises a first substantially cylindrical recess (40) extending along the main axis from the first end, said first recess ending at a planar shoulder (44) substantially perpendicular to said main axis, the first recess and the
(Continued)

planar shoulder being received inside the enlarged head, the first mounting surfaces (42, 46) being formed by an inner surface of the first recess.

14 Claims, 3 Drawing Sheets

(51) Int. Cl.
    *B25B 31/00*        (2006.01)
    *F16B 19/10*        (2006.01)

(56) References Cited

U.S. PATENT DOCUMENTS

| | | | | |
|---|---|---|---|---|
| 7,600,956 B2* | 10/2009 | McDuff | .............. | F16B 13/0808 |
| | | | | 411/60.1 |
| 2012/0230796 A1* | 9/2012 | McClure | ............... | F16B 19/109 |
| | | | | 411/80.1 |
| 2016/0363157 A1* | 12/2016 | Sobotta | ................. | F16B 39/284 |

FOREIGN PATENT DOCUMENTS

| | | |
|---|---|---|
| EP | 3147520 | 3/2017 |
| JP | S62167913 | 7/1987 |

\* cited by examiner

FASTENING SOCKET FOR ASSEMBLING STRUCTURES AND ASSOCIATED ATTACHMENT

CROSS REFERENCE TO RELATED APPLICATIONS

This application is a National Stage of International Application No. Corresponds to PCT/EP2018/075578, filed Sep. 21, 2018, which claims priority from FR 17 58734 filed Sep. 21, 2017, the entire contents of which are incorporated herein by reference.

BACKGROUND

The present invention relates to a fastening socket for assembling at least two previously drilled structures, said socket extending along a main axis between a first and a second open end, said socket comprising a substantially cylindrical body and an enlarged head, said enlarged head comprising first mounting surfaces capable of being assembled to a first installation component and for rotationally locking said first installation component about the main axis.

The invention applies particularly to temporary fasteners such as clamps.

Prior to the final assembly of two structural elements, it is known to carry out a temporary assembly of said elements by means of temporary fasteners inserted into through-holes. Such temporary fasteners are described in particular in document EP2247862.

During assembly of said temporary fasteners, a first mounting tool locks the socket in rotation in the through-hole while a second tool rotates a screw disposed in the socket. In this way, the socket must be locked firmly during screwing, which can be driven in a rotationally driven manner.

Furthermore, in the case of a mounting of the temporary fasteners made by an automaton, the fastener must be able to be gripped and moved easily by said automaton.

Finally, the fastener must be able to be completely removed from the through-holes by an automatic machine, even in the presence of mastic previously placed in the hole that potentially started to cure.

The temporary fasteners of EP2247862 document have in particular cross notches arranged in the socket head. These notches can cause insufficient locking of the socket, in particular when a large torque is exerted on the screw. Furthermore, such notches do not allow only sufficient gripping of the fastener by an automatic machine, which implies providing said automaton with additional gripping means.

The aim of the invention is to overcome these disadvantages. For this purpose, the subject of the invention is a fastening socket of the aforementioned type, comprising a first substantially cylindrical recess extending along the main axis from the first end, said first recess leading to a planar shoulder substantially perpendicular to said main axis, the first recess and the planar shoulder being received inside the enlarged head, the first mounting surfaces being formed by an inner surface of the first recess.

According to an advantageous aspect of the invention, the fastening socket is such that the first mounting surfaces comprise flats formed radially projecting or recessed relative to a cylindrical inner surface of the first recess.

The invention further relates to a fastener for assembling at least two previously drilled structures, comprising a socket as described above and an elongated element, movable inside the socket, said elongated element comprising a substantially cylindrical rod and a head arranged at a first end of said rod, said head of the elongated element comprising a second substantially cylindrical recess extending along the main axis, said second recess comprising second mounting surfaces adapted to be joined to a second installation element and to rotationally secure the elongate element and said second installation element about the main axis.

According to other advantageous aspects of the invention, the fastener comprises one or more of the following features, taken separately or according to all technically possible combinations:
- the socket comprises an inner ring for axially guiding the rod of the elongate element, said ring extending radially from an inner surface of the body;
- the shank of the elongated element is provided with a thread;
- the fastener further comprises a hooking element comprising: a base capable of sliding in the socket along the main axis, said base comprising a central opening; and tabs connected to said base around the central opening, said tabs extending through the second open end of the socket, each tab comprising a hooking nose; the elongated element being movable along the main axis in the central opening of the base, so as to radially move the legs between a retracted position and an extended position;
- the central opening of the base is provided with a thread complementary to the thread of the shank of the elongate element;
- a second end of the elongated element comprises a lug extending along the main axis from the rod, said lug having a transverse dimension smaller than a transverse dimension of the rod, the fastener further comprising a ring assembled to said lug, said ring forming an axial stop with respect to the base of the hooking element;
- the ring comprises a first and a second substantially cylindrical portions, aligned axially, said first and second portions having respectively an outer diameter smaller than and greater than a minimum diameter of the central opening of the base, a junction between said first and second portions forming the axial stop.

The invention further relates to a setting nose for assembling a fastener as described above with at least two previously drilled structures, said setting nose comprising: a first installation element having a tubular shape, said first installation element having a front portion able to fit into the first recess of the enlarged head of the socket, said first installation element being configured to join with the first mounting surfaces of the enlarged head so as to lock the socket in rotation about the main axis, and a second installation element arranged inside the first installation element, said second installation element comprising a tip configured to fit into the second recess of the head of the element and to join the second mounting surfaces, the second installation element being capable of exerting a torsional torque on said elongate element.

According to an advantageous aspect of the invention, the setting nose comprises one or more of the following features, taken separately or according to all technically possible combinations:
- the setting nose further comprises a tubular blocking element movable in rotation inside the first installation element, the second installation element being arranged inside said blocking element, an axial end of said blocking element having a collar extending radially outwards, the front part of the first installation element and the collar respectively have a first and a second radial surface of identical cross-section, the setting nose being such that, in a first so-called installation configuration, said first and second radial surfaces are axially aligned, said collar thus being able to fit into the first recess of the enlarged head of the socket in such a way as to bear axially on the one hand against the planar shoulder of the socket and on the other hand against the front part of the first installation element;

the first and second radial surfaces are configured such that, in a second so-called locking configuration, a portion of the second radial surface forms an outer projection with respect to the first radial surface.

The invention further relates to an assembly for installing a fastener, said assembly comprising a fastener as described above and a setting nose as described above.

According to an advantageous aspect of the invention, said attachment and said delivery nose are configured such that, in the second locking configuration, the collar is able to be axially locked between the planar shoulder and the first mounting surfaces of the socket.

BRIEF DESCRIPTION OF THE DRAWINGS

The invention will be better understood on reading the following description, given solely by way of non-limiting example and made with reference to the drawings, in which.

DETAILED DESCRIPTION

Figure 1:
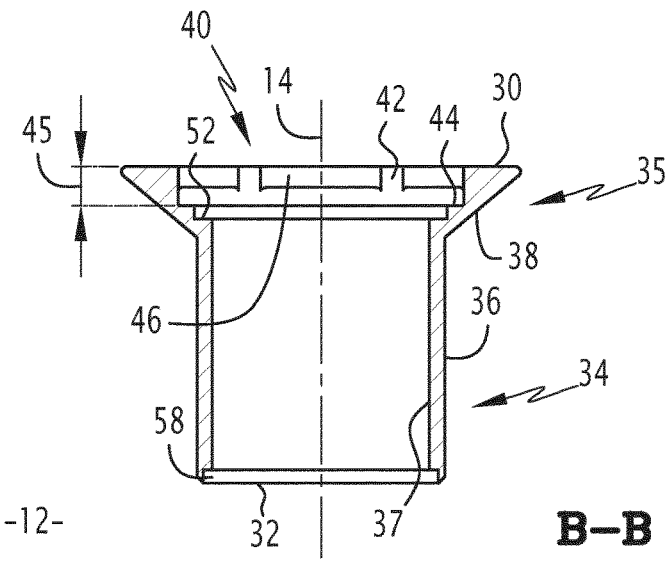
FIG. 1 is a cross-sectional view of a socket according to a first embodiment of the invention.
Figure 2:
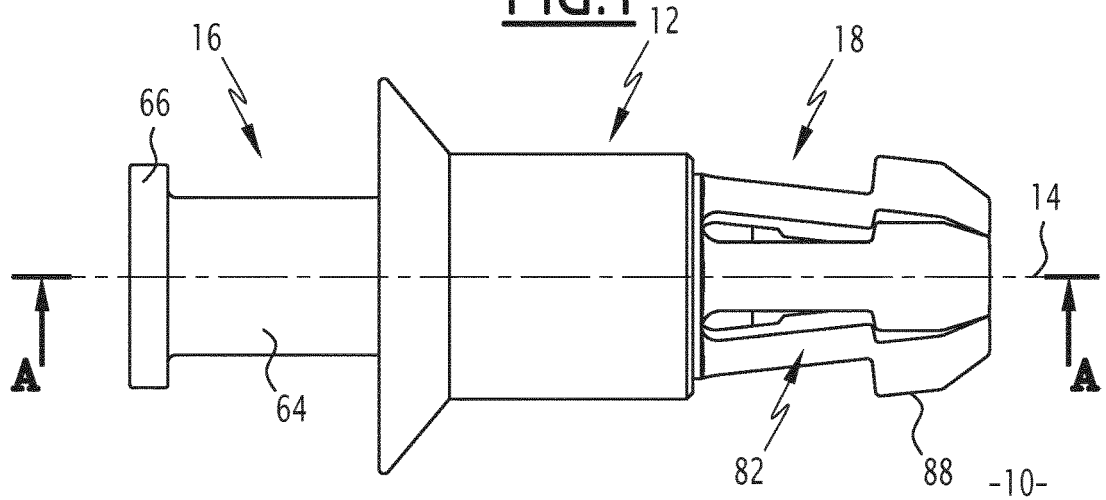
FIGS. 2 and 3 are views, respectively lateral and in cross section, of a fastener comprising the socket of FIG. 1.
Figure 3:
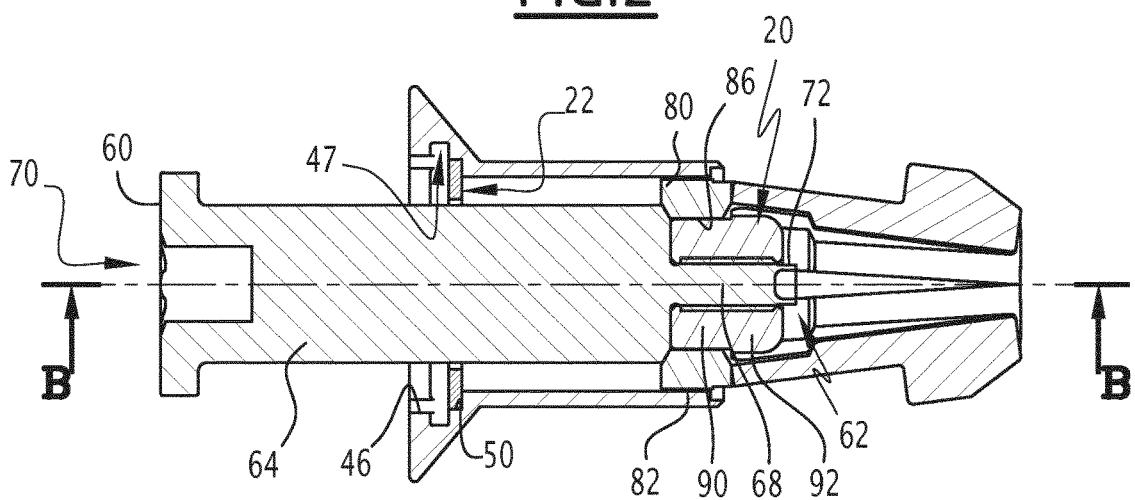

FIGS. 2 and 3 show a fastener 10 according to a first embodiment of the invention, comprising a fastening socket 12 according to a first embodiment of the invention. The socket 12 is shown only in FIG. 1.

Figure 4:
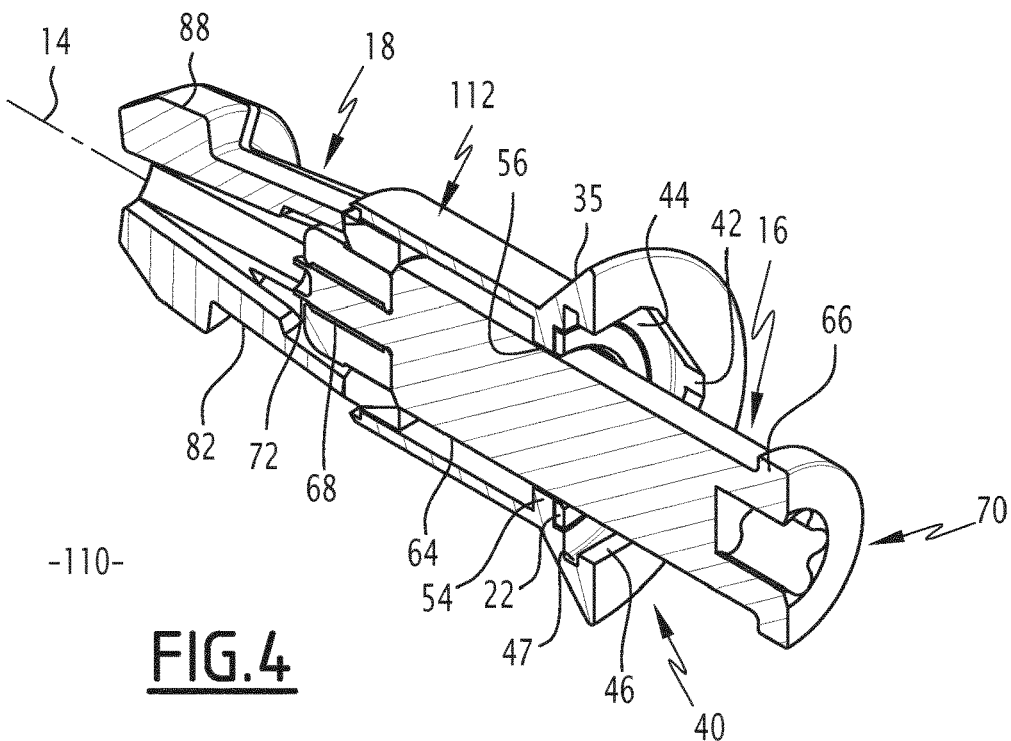
FIG. 4 is a perspective view, in cross section, of a fastener comprising the socket according to a second embodiment of the invention.

FIG. 4 shows a fastener 110 comprising a fastening socket 12 according to a second embodiment of the invention.

In the following description, the fasteners 10 and 110 and the sockets 12 and 112 will be described simultaneously, the common elements being designated by the same reference numbers.

In the embodiments shown, the fastener 10, 110 is a removable attachment, intended for the temporary assembly of two previously drilled structures (not shown). Alternatively, the socket 12, 112 is incorporated into another type of fastener, for example a permanent fastener.

The fastener 10, 110 extends along a main axis 14 defining an axial direction, and comprises: the socket 12, 112; an elongate element 16; a hooking element 18, an assembly ring 20 and a bearing washer 22.

The socket 12, 112 has a substantially tubular shape, extending along the main axis between a first 30 and a second 32 open ends. The socket 12, 112 comprises a body 34 and an enlarged head 35.

The body 34 has an outer surface 36 and an inner surface 37, which are substantially cylindrical. The outer surface 36 is cylindrical of revolution. The inner surface 37 has an anti-rotation shape. The inner surface is preferably formed of flats and has, for example, a hexagonal or octagonal cross-section.

In the embodiments shown, the enlarged head 35 has a frustoconical outer surface 38 intended to be placed in a countersink of one of the structures to be assembled. The enlarged head 35 also has a flat surface, substantially perpendicular to the main axis 14 and forming the first end 30 of the socket 12, 112.

The enlarged head 35 comprises a first substantially cylindrical recess 40, extending along the main axis 14 from the first end 30. In the embodiments shown, the first recess 40 comprises in particular an inner cylindrical surface 42 of revolution.

The first recess 40 ends axially on a first shoulder 44, received inside the enlarged head 35. The first shoulder 44 is planar and substantially perpendicular to the main axis 14. In the embodiments shown, the first shoulder 44 has an annular shape.

The first recess 40 has, in particular, a depth 45 along the main axis 14, between the first end 30 of the socket 12, 112 and the first shoulder 44.

The enlarged head 35 further comprises first mounting surfaces 46 capable of blocking the recess 40 in rotation about the main axis. Said first mounting surfaces 46 have an anti-rotation shape and are preferably formed of flats, arranged in axially extending planes. The flats 46 extend from the first end 30 of the socket 12, 112 but do not reach the first shoulder 44.

In the embodiments shown, the flats 46 project radially with respect to the cylindrical inner surface 42, such that a diameter passing through the centers of the flats 46 is less than the largest diameter of the first shoulder 44.

Said shoulder 44, an axial end of the flats 46 and the cylindrical inner surface 42 thus define a hollow volume 47.

Alternatively, the flats are formed recessed relative to said cylindrical inner surface.

The first recess 40 is extended axially by a circular groove 50, said groove having a diameter smaller than the diameter of the cylindrical inner surface 42. The groove 50 ends axially at a second plane shoulder 52, substantially perpendicular to the main axis 14. The groove 50 and the shoulder 52 are in particular capable of receiving the washer 22.

As can be seen in FIGS. 1 and 2, the shoulder 52 of the socket 12 opens radially on the inner surface 37 of the body 34. On the other hand, as can be seen in FIG. 4, the shoulder 52 of the socket 12 is extended radially by a ring 54 projecting relative to the said inner surface 37. The ring 54 comprises a circular orifice 56, arranged along the main axis 14.

The second end 32 of the socket 12, 112 comprises a crimping flange 58. In FIGS. 1 to 6, the crimping flange 58 is shown before deformation.

The elongate member 16 extends along the main axis 14 between a first 60 and a second 62 end. The elongated element 16 comprises a substantially cylindrical rod 64, as well as a head 66 and a lug 68 arranged respectively at the first 60 and the second 62 ends of said elongated element.

In the illustrated embodiments, the rod 64 is a threaded rod. A maximum diameter of the rod 64 is less than a minimum transverse dimension of the inner surface 37 of the body 34, allowing mobility of the elongate element 16 inside the socket 12, 112.

In the case of the socket 112, the maximum diameter of the rod 64 is substantially equal to the diameter of the circular orifice 56 of the ring 54, said ring ensuring an axial guidance of the elongate element 16.

The head 66 of the elongate element 16 has a cylindrical shape projecting radially with respect to the rod 64. The head 66 has a planar end, substantially perpendicular to the main axis 14 and forming the first end 60 of the elongate element.

The head 66 of the elongated element 16 comprises a second recess 70 substantially cylindrical, extending along the main axis 14 from said first end 60. The second recess 70 forms second mounting surfaces capable of being connected to an installation tool in order for said tool to rotate the elongate element 16.

The second recess 70 is, for example, a multi-lobed impression, as described in the document EP2458232 in the name of the applicant.

The lug 68 extends along the main axis 14 and axially extends the rod 64. A diameter of said lug is less than a minimum diameter of the rod 64.

The lug 68 comprises a crimping flange 72 forming the second end 62 of the elongate element. In FIGS. 3 and 4, the crimping flange 72 is shown before deformation.

The hooking element 18 comprises a base 80 and at least two tabs 82 connected to said base 80. In the embodiments shown, the hooking element 18 comprises four identical tabs 82.

The base 80 of the hooking element 18 has a substantially cylindrical shape and has an outer surface 84 of complementary shape to the inner surface 37 of the body 34. The base 80 is thus able to slide in the socket 12, 112 along the main axis 14, while being locked in rotation in said socket.

The base 80 comprises a central opening 86 arranged along the main axis 14. The central opening 86 is provided with an internal thread that is complementary to the thread of the rod 64 of the elongate element 16.

The tabs 82 are arranged around the central opening 86 and extend axially from the base 80, through the second open end 32 of the socket 12, 112. One end of each tab 82 is formed by a hooking lip 88.

The tabs 82 and/or their junction with the base 80 have certain elasticity. More specifically, the tabs 82 are movable relative to the main axis 14 between a retracted position, in which the hooking lips 88 are in contact with each other, and a deployed position, in which said hooking lips 88 are spaced radially from one another.

Figure 5:
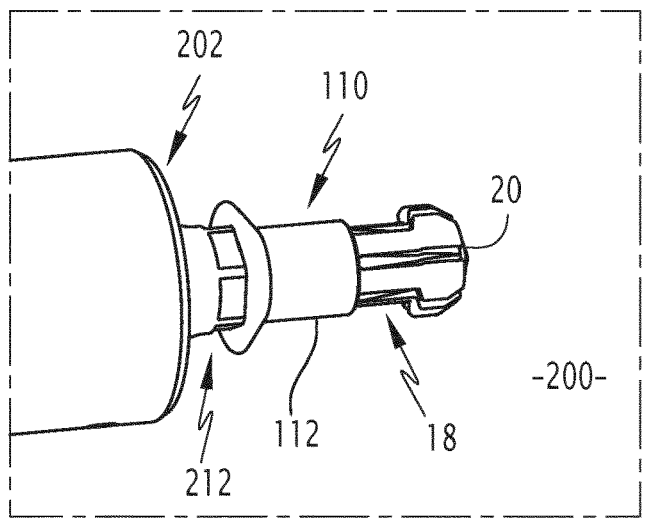
FIG. 5 is a side detailed view of an installation assembly comprising the attachment of FIG. 4 and a setting nose according to a first embodiment of the invention.

FIGS. 2, 3 and 4 show the attachment 10, 110 in the retracted position. FIG. 5 shows the attachment 110 in the deployed position.

In the retracted position and in the deployed position, a maximum diameter at the hooking lips 88 is respectively smaller and greater than a diameter of the outer surface 36 of the body 34 of the socket 12, 112.

The assembly ring 20 is assembled to the lug 68 of the elongate element 16 and to the central opening 86 of the base 80 of the hooking element 18; the assembly ring 20 thus assembles the elongate element 16 and the hooking element 18.

More specifically, the assembly ring 20 is fixed axially with respect to the lug, being blocked on either side by the rod 64 and by the crimping flange 72. Said flange is folded radially outwards after deformation.

On the other hand, the assembly ring 20 comprises a first 90 and a second 92 axially aligned portions. Each of the first 90 and second 92 portions has a cylindrical outer surface of revolution.

The first portion 90, arranged on the side of the rod 64, has an outer diameter less than or equal to a minimum diameter of the central opening 86 of the base 80. In a so-called release configuration of the fastener 10, 110, as shown in FIGS. 3 and 4, said first portion 90 is inserted into said central opening 86.

The second portion 92, arranged on the side of the crimping flange 72, has, on the contrary, an external diameter greater than the minimum diameter of the central opening 86. Thus, a junction between the first 90 and second 92 portions forms an axial stop with respect to the base 80, preventing a separation of the elongate element 16 and the hooking element 18 in the disengaged configuration.

FIG. 5 shows an assembly 200 for installing the fastener 10, 110 in order to assemble two previously drilled structures. The assembly 200 comprises at least one fastener 10, 110, as well as a setting nose 202 according to a first embodiment. The setting nose 202 alone is shown in FIGS. 6 to 9.

Figure 10:
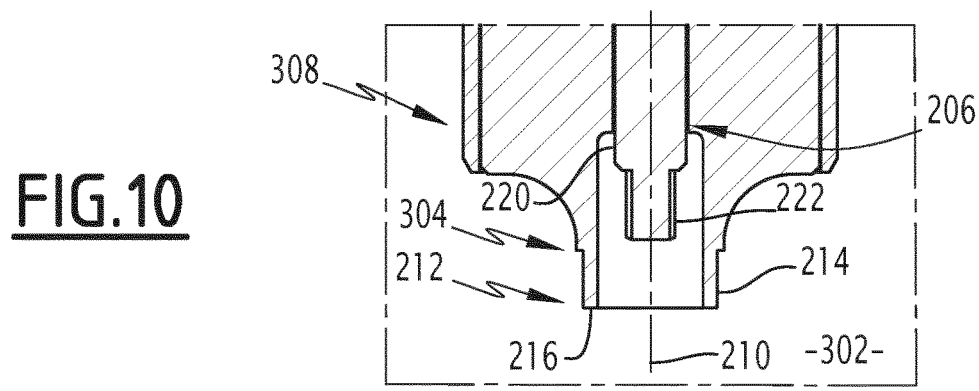
FIG. 10 is a cross-sectional view of a setting nose according to a second embodiment of the invention.

FIG. 10 shows in section a setting nose 302 according to a second embodiment. Each of the setting noses 202, 302 is able to be used for an installation of the fastener 10, 110. In The following description, the setting noses 202 and 302 will be described simultaneously, the common elements being designated by the same reference numbers.

The setting nose 202, 302 comprises in particular a first 204, 304 and a second 206 installation element, as well as a body 208, 308 suitable for being assembled to an automaton (not shown). The setting nose 202 of FIGS. 5 to 9 further comprises a blocking element 209.

The first installation element 204, 304 is a tubular socket, extending along a setting axis 210. The first installation element 204, 304 comprises a rear portion connected to the body 208, 308, as well as a front portion 212.

The front part 212 has a shape capable of being fitted into the first recess 40 of the enlarged head 35 of the socket 12, 112. In particular, the front part 212 comprises a radial surface 214; said radial surface comprises curved surfaces of complementary shape to the cylindrical inner surface 42, alternated with flats 215 complementing the flats 46 of the first recess 40.

The front portion 212 further includes a planar end surface 216. In the embodiment 302 of FIG. 10, the end surface 216 is intended to come into contact with the first shoulder 44 of the socket 12, 112.

The second installation element 206 is arranged inside the first installation element 204, 304; said second element is movable in rotation and in translation about the setting axis 210 with respect to said first installation element 204, 304.

Figure 8:
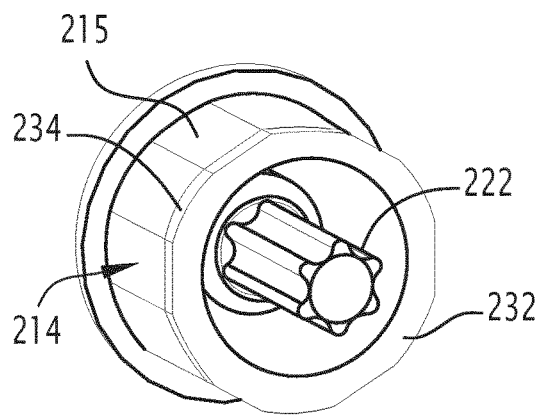
FIGS. 8 and 9 are perspective detail views of the fitting nose of FIGS. 5 to 7, respectively in a first and a second configuration.
Figure 9:
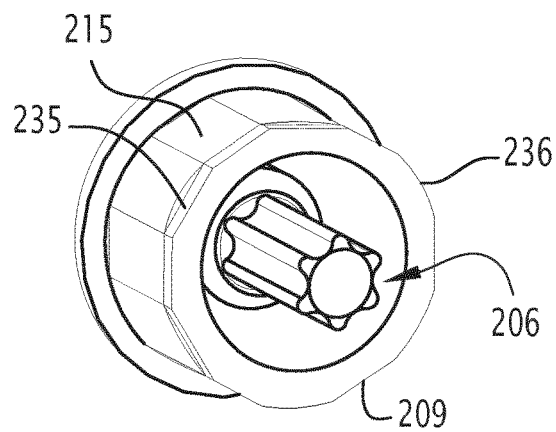

The second installation element 206 comprises a shaft 220 and a tip 222. Said tip 222, in particular visible in perspective in FIGS. 8 and 9, is configured to fit into the second recess 70 of the head 66 of the elongate element 16.

Furthermore, the second installation element 206 is connected to a motor of the setting nose 202, 302, or of the automaton, or to a manual tool, so as to be able to exert a torsional torque on the elongate element 16.

Preferably, the first recess 40 of the enlarged head 35 of the socket 12, 112 and the front part 212 of the first installation element 204, 304 are configured to fit in such a way as to temporarily secure the fastener 10, 110 and the setting nose 202, the main axis 14 coinciding with the setting axis 210.

More specifically, the depth 45 of the first recess 40 is chosen to be sufficiently large so that the friction between said first recess 40 and the front portion 212 compensate for the weight of the fastener 10, 110. Said fastener can thus be transported by the automaton equipped with the setting nose 202, 302 without any other gripping than said setting nose.

The setting nose 202 of FIGS. 5 to 9 will now be described more precisely. The blocking element 209 is arranged inside the first installation element 304. The blocking element 209 is a tubular socket, extending along the axis of installation 210, between a rear end 230 and a front end 232. Adjacent to said front end 232, the blocking element 209 comprises a central tubular portion 233, an outer diameter of which permits the rotation of said blocking element inside the first installation element 204. The front end 232 is made in the form of a collar extending radially outwards with respect to the central tubular portion 223. The end surface 216 of the first installation element 204 is intended to come axially in contact with said collar 232.

A radial surface 234 of the collar 232 has a cross-section identical to the radial surface 214 of the front portion 212 of the first installation element 204. More specifically, the radial surface 234 has an alternation of flats 235 and arc portions 236 in a so-called installation position, shown in FIG. 8, the locking element 209 is in a first angular position relative to the first installation element 204, such that the flats 235 and 215 are aligned. In the direction of the setting axis 210, the length of said aligned flats 235, 215 is equal, within tolerances, to the depth 45 of the first recess 40 of the socket 12, 212.

In said locking position, the locking element 209 is in a second angular position relative to the first installation element 204 such that the flats 235 are misaligned with the flats 215 of said first installation element.

Figure 6:
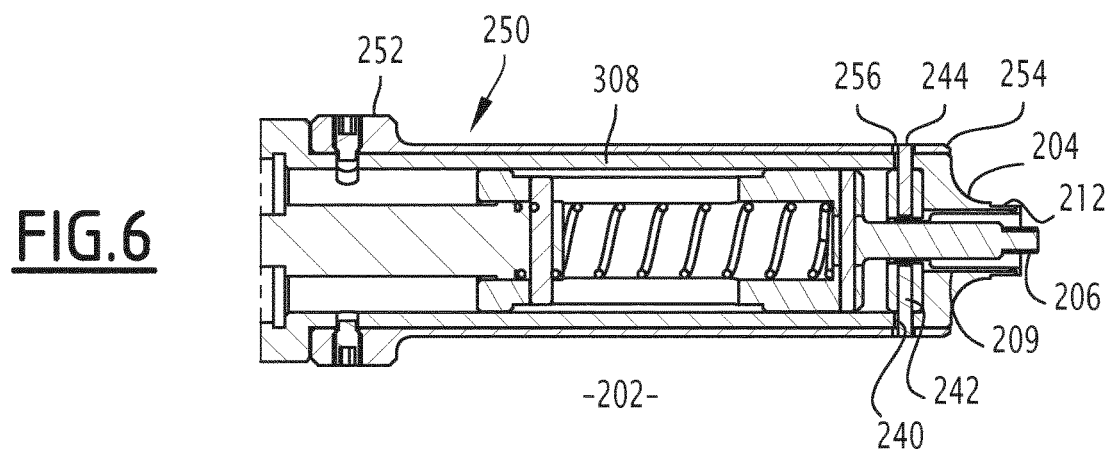
FIG. 6 is a cross-sectional view of the setting nose of FIG. 5.
Figure 7:
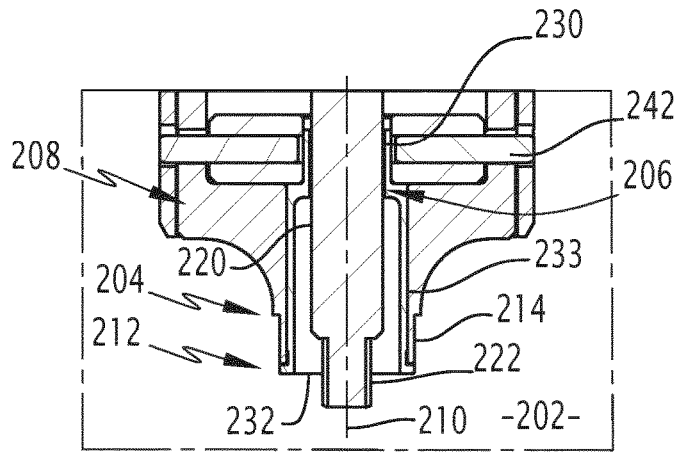
FIG. 7 is a detail view of the setting nose of FIGS. 5 and 6.

An example of a mechanism for rotating the blocking element 209 is visible in FIG. 6. The rear part of the first installation element 204 comprises at least one lateral opening 240. Said lateral opening 240 extends around the installation axis 210 according to an angular portion corresponding at least to a distance between the first and second angular positions of the blocking element 209.

The setting nose 202 further comprises at least one pin 242 arranged radially in the lateral opening 240. An inner end of the pin 242 is fixed to the rear end 220 of the blocking element 209. An outer end 244 of said pin 242 forms a radial projection outside the first installation element 204. The pin 242 is able to move in the lateral opening 240 about the installation axis 210.

The setting nose 202 further comprises a tubular ring 250, arranged around the body 208 and the rear part of the first installation element 204. The ring 250 comprises a protruding rear portion 252, for example a soft or grooved portion to facilitate its manual gripping.

Near a front end 254, the ring 250 comprises at least one orifice 256, having a shape substantially complementary to that of a section of the pin 242. The orifice 256 has, for example, a slightly oblong shape, extending axially.

The outer end 244 of the pin 242 is housed in the orifice 256. Thus, rotation of the ring 250 relative to the body 208 of the setting nose 202 allows the pin 242 to move in the lateral opening 240 and to drive in rotation the locking element 209. A manual rotation of the ring 250 thus drives the rotation of the locking element 209 between the installation and locking positions.

Preferably, the setting nose 202 comprises two lateral opening assemblies 240/pin 242/orifice 256, said two assemblies being arranged facing each other with respect to the axis 210.

Other mechanisms of rotation of the locking element 209 can be used, in particular, suitable for rotating the blocking element by means of an automatic machine.

A method of installing the fastener 10, 110 using a setting nose 202, 302 will now be described. The fastener 10, 110 is initially in the disengaged configuration. In the case of the setting nose 202 of FIGS. 5 to 9, said setting nose is in the installation configuration of FIG. 8.

An automaton equipped with the setting nose 202, 302 grips the fastener 10, 110 by assembling the front portion 212 of the first installation element 204, 304 with the first recess 40 of the enlarged head 35 of the socket 12, 112. The automaton then moves the fastener 10, 110, thus assembled to the setting nose 202, 302, up to a first and a second structure to be assembled, drilled by a through hole.

The automaton introduces the fastener 10, 110 into said through-hole until the enlarged head 35 abuts against a front face of the first structure. The socket 12, 112 is then received in the through-hole and the hooking lips 88 of the tabs 82 protrude from the second structure.

The front part 212 of the first installation element 204, 304 exerts an axial force against the enlarged head 35 in the direction of the first structure, in order to rotationally lock the socket 12, 112. The automaton introduces the tip 222 of the second installation element 206 into the second recess 70 of the head 66 and then exerts a torsional torque on the elongate element 16. The rotation of the rod 64 causes the thread of said rod to engage in the tapping of the central opening 86 of the base 80 of the coupling element. The elongated element 16 moves axially towards the hooking lips 88 of the tabs 82. The second portion 92 of the assembly ring then radially spreads said hooking lips.

The rotation of the elongate element 16 is continued until the hooking lips 88 are in axial abutment against a rear face of the second structure and the head 66 is in contact with the second shoulder 52 and/or the elastic washer 22. In the case of the socket 112, the washer 22 is sandwiched between the head 66 of the elongate element 16 and the guide ring 54.

Thus, the fastener 10, 110 engages the two structures to be assembled to each other.

A similar method, with a rotation of the elongate element 16 in the opposite direction, makes it possible to detach the fastener 10, 110 from the through-hole of said structures. The fastener 10, 110 can thus be reused.

In the case of the setting nose 202 of FIGS. 5 to 9, a variant of the above method makes it possible to lock the fastener 10, 110 to the said setting nose in order to facilitate the transport thereof.

More specifically, according to said variant, an operator grasps the fastener 10, 110, and inserts the front portion 212 of the first installation element 204 and the collar 232 of the locking element 209 into the first recess 40 of the enlarged head 35 of the socket 12, 112. The flats 215, 235 are then aligned with the flats 46 of the socket 12, 112. The operator rotates the ring 240 in one direction, so that the locking element 209 reaches the locking position shown in FIG. 9. In this position, the arc portions 236 of the collar 232 are arranged in the hollow volume 47 of the cylindrical inner surface 42 of the first recess 40, between the shoulder 44 and an axial end of the flats 46. Thus, the socket 12, 212 is blocked axially inside the setting nose 202 and can be transported in any horizontal or vertical direction to the first and second structures to be assembled.

Once the fastener 10, 110 is secured to the structures to be assembled, the operator turns the ring 250 in the other direction, so as to replace the locking element 209 in the installation position and then to unlock axially the fastener 10, 110 of the setting nose 20.

The axial locking of the fastener 10, 110 in the setting nose 202 by the locking element 209 allows the fastener 10, 110 to be transported in any direction without the risk of loss of said fastener. It also allows the fastening 10, 110 to be removed from the two structures by simply exerting a traction on the setting nose 202, even if the mastic interposed between the structures to be assembled has hardened around the socket 12, 112.

The invention claimed is:

1. Fastening socket for assembling at least two previously drilled structures, said socket extending along a main axis between a first and a second open ends, said socket comprising a substantially cylindrical body and an enlarged head;
said enlarged head comprising first mounting surfaces capable of being assembled to a first installation element and for rotationally locking said first installation element about the main axis,
characterised in that it comprises a first recess substantially cylindrical extending along the main axis from the first end, said first recess leading to a planar shoulder substantially perpendicular to said main axis, the first recess and the planar shoulder being received inside the enlarged head, the first mounting surfaces are formed by an inner surface of the first recess; and
wherein first mounting surfaces extend from the first end of the socket but do not reach the planar shoulder, the first mounting surfaces thereby defining a recessed volume with said planar shoulder.

2. Fastening socket according to claim 1, wherein the first mounting surfaces comprise flats formed radially protruding or recessed relative to a cylindrical inner surface of the first recess.

3. Fastener for assembling at least two pre-drilled structures, comprising:
a fastening socket according to claim 1, and
an elongated element movable inside the socket, said elongated element comprising a substantially cylindrical rod and a head arranged at a first end of said rod, said head of the elongated element comprises a second recess substantially cylindrical extending along the main axis, said second recess comprising second mounting surfaces capable of being assembled to a second installation element and rotationally secure the elongate element and said second installation element about the main axis.

4. Fastener according to claim 3, wherein the socket comprises an inner ring for axially guiding the rod of the elongate element, said ring extending radially from an inner surface of the body.

5. Fastener according to claim 3, in which the rod of the elongate element is provided with a thread.

6. Fastener according to claim 3, further comprising a hooking element, said hooking element comprising:
a base capable of sliding in the socket along the main axis, said base comprising a central opening; and
tabs connected to said base around the central opening, said tabs extending through the second open end of the socket, each tab comprising a hooking lip;
the elongated element being movable along the main axis in the central opening of the base, so as to radially move the tabs between a retracted position and an extended position.

7. Fastener according to claim 6, wherein the rod of the elongate element is provided with a thread, wherein the central opening of the base is provided with an internal thread complementary to the thread of the rod of the elongate element.

8. Fastener according to claim 6, wherein a second end of the elongated element comprises a lug extending along the main axis from the rod, said lug having a transverse dimension smaller than a transverse dimension of the rod, the fastener further comprising a ring assembled to said lug, said ring forming an axial stop with respect to the base of the coupling element.

9. Fastener according to claim 8, wherein the ring comprises a first and a second substantially cylindrical portions, aligned axially, said first and second portions respectively having a diameter and greater than a minimum diameter of the central opening of the base, a junction between said first and second portions forming the axial stop.

10. Setting nose for assembling a fastener according to claim 3 with at least two pre-drilled structures, said setting nose comprising:
a first installation element of tubular shape, said first installation element having a front portion capable of fitting into the first recess of the enlarged head of the socket, said first installation element being configured to fit together with the first mounting surfaces of the enlarged head so as to block the socket in rotation about the main axis; and
a second installation element arranged inside the first installation element, said second installation element comprising a tip configured to fit into the second recess of the head of the elongate element and to join the second mounting surfaces, the second installation element being able to exert a torsional torque on said elongate element.

11. Setting nose according to claim 10, further comprising a tubular blocking element movable in rotation inside the first installation element, the second installation element being arranged inside said blocking element, an axial end of said blocking element having a collar extending radially outwards, the front portion of the first installation member and the collar respectively have a first and a second radial surfaces of identical cross-section, the setting nose being such that, in a first installation configuration, said first and second radial surfaces are axially aligned, said collar thus being able to fit into the first recess of the enlarged head of the socket, so as to bear axially on the one hand against the planar shoulder of the socket and on the other hand against the front part of the first installation element.

12. Setting nose according to claim 11, wherein the first and second radial surfaces are configured such that, in a second locking configuration, a portion of the second radial surface forms an external projection with respect to the first radial surface.

13. Assembly for installing a fastener for assembling at least two pre-drilled structures comprising:
a fastening socket, said socket extending along a main axis between a first and a second open ends, said socket comprising a substantially cylindrical body and an enlarged head;
said enlarged head comprising first mounting surfaces capable of being assembled to a first installation element and for rotationally locking said first installation element about the main axis,
characterised in that it comprises a first recess substantially cylindrical extending along the main axis from the first end, said first recess leading to a planar shoulder substantially perpendicular to said main axis, the first recess and the planar shoulder being received inside the enlarged head, the first mounting surfaces are formed by an inner surface of the first recess, an elongated element movable inside the socket, said elongated element comprising a substantially cylindrical rod and a head arranged at a first end of said rod, said head of the elongated element comprises a second recess substantially cylindrical extending along the main axis, said second recess comprising second mounting surfaces capable of being assembled to a second installation element and rotationally secure the elongate element and said second installation element about the main axis, and a setting nose according to claim 12, said fastener and said setting nose being configured such that, in the second locking configuration, the collar is able to be axially locked between the planar shoulder and the first mounting surfaces of the socket.

14. Assembly according to claim 13, wherein the fastener comprises a socket wherein first mounting surfaces extend from the first end of the socket but do not reach the planar shoulder, the first mounting surfaces thereby defining a recessed volume with said planar shoulder, the flange of the setting nose being able to be axially locked in the hollow volume of the socket.

* * * * *